(12) United States Patent
Nasir et al.

(10) Patent No.: US 10,208,628 B2
(45) Date of Patent: Feb. 19, 2019

(54) TURBINE ENGINE DESIGNS FOR IMPROVED FINE PARTICLE SEPARATION EFFICIENCY

(71) Applicant: HONEYWELL INTERNATIONAL INC., Morris Plains, NJ (US)

(72) Inventors: Shakeel Nasir, Torrance, CA (US); John Schugardt, Chandler, AZ (US); Nick Nolcheff, Chandler, AZ (US); John Meier, Phoenix, AZ (US); Yogendra Yogi Sheoran, Scottsdale, AZ (US); Shezan Kanjiyani, Glendale, AZ (US); Daniel Aukland, Poenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 415 days.

(21) Appl. No.: 15/085,625

(22) Filed: Mar. 30, 2016

(65) Prior Publication Data

US 2017/0284226 A1   Oct. 5, 2017

(51) Int. Cl.
*F01D 25/32* (2006.01)
*F02C 7/36* (2006.01)
(Continued)

(52) U.S. Cl.
CPC ............... *F01D 25/32* (2013.01); *F02C 7/36* (2013.01); *F04D 29/4213* (2013.01);
(Continued)

(58) Field of Classification Search
CPC .... F01D 25/32; F04D 29/4213; F04D 29/701; F02C 7/36
See application file for complete search history.

(56) References Cited

U.S. PATENT DOCUMENTS

| 2,709,893 A | * | 6/1955 | Birmann | F02C 3/05 |
| | | | | 415/115 |
| 3,362,629 A | * | 1/1968 | Papapanu | F04D 29/441 |
| | | | | 217/52 |

(Continued)

FOREIGN PATENT DOCUMENTS

| EP | 1874626 A2 | 1/2008 |
| JP | 2002242699 A | 8/2002 |

OTHER PUBLICATIONS

Extended EP Search Report for Application No. 17200875.7 dated Apr. 5, 2018.

(Continued)

*Primary Examiner* — Woody A Lee, Jr.
(74) *Attorney, Agent, or Firm* — Lorenz & Kopf, LLP

(57) ABSTRACT

A turbine engine incorporating a fine particle separation means includes a radial compressor that rotates about a longitudinal axis, a radially-oriented diffuser located downstream and radially outward, with respect to the longitudinal axis, from the radial compressor, and a flow path positioned downstream and radially outward, with respect to the longitudinal axis, from the diffuser, wherein the flow path comprises an outer annular wall and an inner annular wall between which the compressed air flows, and wherein the flow path comprises an arc the redirects the compressed air from flowing in a substantially radial flow direction to a substantially axial flow direction. The turbine engine further includes an extraction slot in the outer annular wall that fluidly connects with a scavenge plenum, the scavenge plenum being positioned adjacent to and radially outward from the outer annular wall at a position downstream axially along the flow path from the arc.

18 Claims, 9 Drawing Sheets

(51) Int. Cl.
*F04D 29/42* (2006.01)
*F04D 29/70* (2006.01)

(52) U.S. Cl.
CPC ........ *F04D 29/701* (2013.01); *F05D 2220/32* (2013.01); *F05D 2260/40311* (2013.01); *F05D 2260/607* (2013.01); *Y02T 50/675* (2013.01)

(56) References Cited

U.S. PATENT DOCUMENTS

| | | | |
|---|---|---|---|
| 3,832,086 A | 8/1974 | Hull, Jr. et al. | |
| 3,993,463 A | 11/1976 | Barr | |
| 4,292,050 A | 9/1981 | Linhardt et al. | |
| 4,463,552 A | 8/1984 | Monhardt et al. | |
| 4,685,942 A | 8/1987 | Klassen et al. | |
| 5,123,240 A | 6/1992 | Frost et al. | |
| 5,857,833 A * | 1/1999 | Dev | F01D 5/085 415/121.2 |
| 6,499,285 B1 | 12/2002 | Snyder | |
| 7,137,777 B2 | 11/2006 | Fried et al. | |
| 7,374,593 B2 | 5/2008 | Snyder | |
| 7,569,094 B2 | 8/2009 | Kane et al. | |
| 7,581,397 B2 | 9/2009 | Strangman et al. | |
| 7,658,061 B2 | 2/2010 | Kawamoto et al. | |
| 7,678,165 B2 | 3/2010 | Tingle et al. | |
| 7,802,433 B2 | 9/2010 | Higgins | |
| 7,874,158 B2 | 1/2011 | O'Neill et al. | |
| 7,927,408 B2 | 4/2011 | Sheoran et al. | |
| 7,967,554 B2 | 6/2011 | Bremer | |
| 8,092,145 B2 * | 1/2012 | Martel | F02C 6/08 415/1 |
| 8,256,277 B2 | 9/2012 | Khibnik et al. | |
| 8,512,450 B2 | 8/2013 | Kazlauskas et al. | |
| 8,539,775 B1 | 9/2013 | Wong | |
| 8,679,210 B2 | 3/2014 | McAuliffe et al. | |
| 8,943,791 B2 | 2/2015 | Tibbott et al. | |
| 9,027,202 B2 | 5/2015 | Huang | |
| 9,046,056 B2 | 6/2015 | Lerg | |
| 9,314,723 B2 | 4/2016 | Judd et al. | |
| 9,650,916 B2 * | 5/2017 | Barton | F01D 25/14 |
| 9,982,599 B2 * | 5/2018 | Suciu | F02C 7/052 |
| 2004/0096316 A1 * | 5/2004 | Simon | F01D 17/141 415/151 |
| 2007/0144139 A1 | 6/2007 | Kawamoto et al. | |
| 2007/0183890 A1 | 9/2007 | Nolcheff | |
| 2007/0235373 A1 * | 10/2007 | Strangman | F04D 29/441 209/580 |
| 2008/0152500 A1 | 6/2008 | Mehring | |
| 2008/0310951 A1 * | 12/2008 | Bremer | F01D 5/081 415/121.2 |
| 2009/0145101 A1 * | 6/2009 | Suciu | F01D 5/022 60/39.092 |
| 2012/0131900 A1 | 5/2012 | Kenyon et al. | |
| 2014/0290254 A1 | 10/2014 | Manning et al. | |
| 2015/0354461 A1 | 12/2015 | Meier et al. | |
| 2015/0377074 A1 | 12/2015 | de Diego et al. | |
| 2016/0115916 A1 | 4/2016 | Kinsey, Jr. et al. | |
| 2016/0123154 A1 | 5/2016 | Manning et al. | |
| 2016/0123227 A1 | 5/2016 | Murray et al. | |
| 2016/0186601 A1 * | 6/2016 | Manning | F01D 25/002 415/121.2 |
| 2017/0082025 A1 | 3/2017 | Ahmadian | |

OTHER PUBLICATIONS

Extended EP Search Report for Application No. 17157027.8-1607 dated Aug. 25, 2017.

USPTO Office Action for U.S. Appl. No. 15/352,839 dated Dec. 17, 2018.

\* cited by examiner

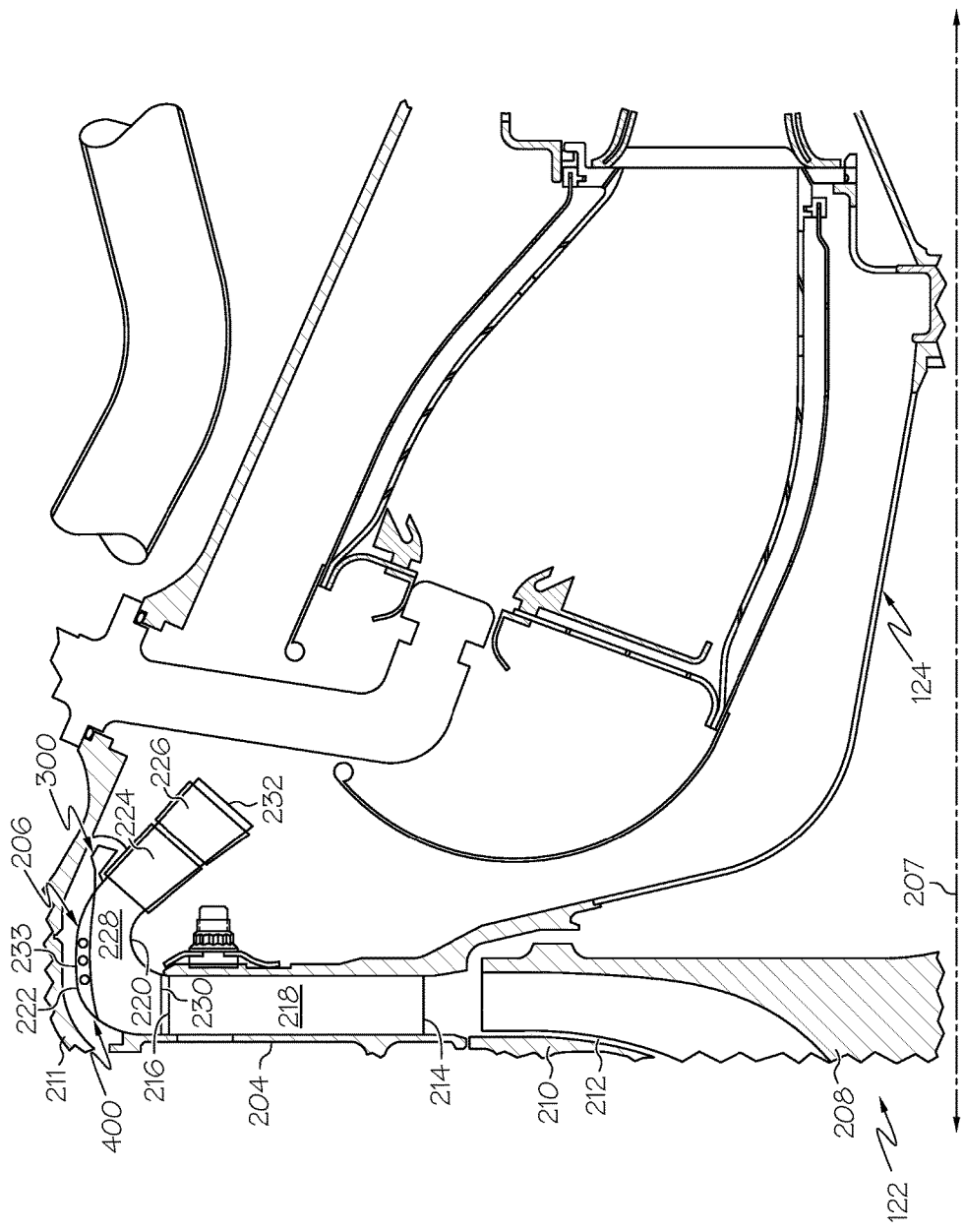

TURBINE ENGINE DESIGNS FOR IMPROVED FINE PARTICLE SEPARATION EFFICIENCY

TECHNICAL FIELD

The present disclosure generally relates to turbine engine technologies. More particularly, the present disclosure relates to turbine engine designs for improved fine particle (such as sand) separation efficiency.

BACKGROUND

Turbine engines are used for a number of purposes, including propulsion and/or driving various other components with electrical, pneumatic, and/or hydraulic power, and may include both propulsion engines and auxiliary power units (APUs). Generally, a gas turbine engine includes a compressor section, a combustion section, and a turbine section. During operation, the compressor section draws in ambient air, compresses the air with one or more compressors, and supplies the compressed air to the combustion section. In addition to the compressed air, the combustion section receives fuel via a fuel injection assembly, mixes the fuel with the compressed air, ignites the mixture, and supplies the high energy combustion gases to the turbine section to drive one or more turbines, including a shaft that may be used to drive the compressor and other components.

During operation, the ambient air drawn into the engine may contain undesirable particles, such as sand and dust, which may cause severe performance degradation, excessive wear, increased maintenance, and eventually premature removal of engines. In order to prevent or at least minimize these impacts, many vehicles use an inlet particle separator system, disposed upstream of the engine, to remove at least a portion of the undesirable particles. A conventional inlet particle separator typically includes a duct system having a fluid passageway that transitions into a scavenge flow path and an engine flow path. Air that is induced into the fluid passageway may have particles suspended therein. The inertia of relatively larger ones of the suspended particles tends to cause these particles to travel in a straight line rather than follow the fluid passageway. Because of the manner in which the inlet particle separator is configured, most of the suspended particles tend to flow into the scavenge flow path rather curve into the engine flow path. As such, relatively clean air is directed into the engine, and contaminated air, which has the particles suspended therein, is directed through the scavenge flow path and is discharged.

Conventional inlet particle separators, such as those described above, operate at relatively high efficiencies for relatively large particles (e.g., >20 microns, or <1000 microns). However, for relatively small particles (e.g., <20 microns, or >=1 micron), the efficiencies can be relatively low, resulting in a significant amount of these relatively small particles being ingested into the engine. These relatively small particles can still have some deleterious effects. For example, these particles can plug secondary flow lines and/or can melt and form glass on relatively hot engine components, such as the combustor, which can significantly reduce performance and the operating life of the engines.

Accordingly, there remains a need in the art for improved propulsion turbine engines and APUs. The improved propulsion turbine engines and APUs would exhibit improved particle separation efficiency, particularly with regard to fine sand particles. These engines may implement novel particle separation means that are provided in addition to or as an alternative to conventional inlet particle separators, and may be located at positions within the engine that are different as compared to conventional inlet particle separators. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to turbine engine designs, including propulsion engines and APUs, for improved fine particle separation efficiency. These designs may be implemented in addition to or as an alternative to conventional inlet particle separators, which generally separate medium- to large-size particles. In one exemplary embodiment, a turbine engine incorporating a fine particle separation means includes a radial compressor that rotates about a longitudinal axis, and which compresses air fed thereto, a radially-oriented diffuser located downstream and radially outward, with respect to the longitudinal axis, from the radial compressor, and which decreases a velocity of and increases a static pressure of the compressed air exiting the radial compressor, and a flow path positioned downstream and radially outward, with respect to the longitudinal axis, from the diffuser, wherein the flow path comprises an outer annular wall and an inner annular wall between which the compressed air flows, and wherein the flow path comprises an arc that redirects the compressed air from flowing in a substantially radial flow direction to a substantially axial flow direction. The turbine engine also includes an extraction slot in the outer annular wall that fluidly connects with a scavenge plenum, the scavenge plenum being positioned adjacent to and radially outward, with respect to the longitudinal axis, from the outer annular wall at a position downstream axially along the flow path from the arc, the extraction slot also being positioned downstream axially along the flow path from the arc.

In another exemplary embodiment, a turbine engine incorporating a fine particle separation means includes a radial compressor that rotates about a longitudinal axis, and which compresses air fed thereto, a radially-oriented diffuser located downstream and radially outward, with respect to the longitudinal axis, from the radial compressor, and which decreases a velocity of and increases a static pressure of the compressed air exiting the radial compressor, and a flow path positioned downstream and radially outward, with respect to the longitudinal axis, from the diffuser, wherein the flow path comprises an outer annular wall and an inner annular wall between which the compressed air flows, and wherein the flow path comprises an arc that redirects the compressed air from flowing in a substantially radial flow direction to a substantially axial flow direction. The turbine engine further includes a plurality of holes along the outer annular wall that fluidly connect with a second scavenge plenum, the plurality of holes being positioned along the arc, the scavenge plenum being positioned adjacent to and radially outward from, with respect to the longitudinal axis, the arc.

In yet another exemplary embodiment, a turbine engine incorporating a fine particle separation means includes a compressor that rotates about a longitudinal axis, and which compresses air fed thereto and a flow path positioned downstream from the compressor, wherein the flow path comprises an outer annular wall and an inner annular wall between which the compressed air flows, and wherein the flow path comprises an arc the redirects the compressed air from flowing in a substantially radial flow direction to a substantially axial flow direction. The turbine engine also includes either or both of 1) an extraction slot in the outer annular wall that fluidly connects with a first scavenge plenum, the first scavenge plenum being positioned adjacent to and radially outward, with respect to the longitudinal axis, from the outer annular wall at a position downstream axially along the flow path from the arc, the extraction slot also being positioned downstream axially along the flow path from the arc, and 2) a plurality of holes along the outer annular wall that fluidly connect with a second scavenge plenum, the plurality of holes being positioned along the arc, the second scavenge plenum being positioned adjacent to and radially outward from, with respect to the longitudinal axis, the arc.

This brief summary is provided to describe select concepts in a simplified form that are further described in the Detailed Description. This brief summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein:

FIG. 2 is a cross section view of a portion of an exemplary combustor that may be used in the engine of FIG. 1, or in other turbine engine embodiments;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A gas turbine engine may be used to power various types of vehicles and systems. A typical gas turbine engine includes a fan section, a compressor section, a combustor section, a turbine section, and an exhaust section. The fan section induces air from the surrounding environment into the engine and accelerates the air toward the compressor section. The compressor section compresses the pressure of the air to a relatively high level and directs the air to the combustor section. A steady stream of fuel is injected into the combustor section, and the injected fuel is ignited to significantly increase the energy of the compressed air. The high-energy compressed air then flows into and through the turbine section, causing rotationally mounted turbine blades therein to rotate and generate energy. The air exiting the turbine section is exhausted from the engine via the exhaust section, and the energy remaining in the exhaust air, in the case of propulsion turbine engines, aids the thrust generated by the air flowing through a bypass plenum.

In some turbine engines, the compressor section is implemented with a centrifugal compressor. A centrifugal compressor typically includes at least one impeller that is rotationally mounted to a rotor and surrounded by a shroud. When the impeller rotates, it compresses and imparts tangential velocity to the air received from the fan section and the shroud directs the air radially outward into a diffuser. The diffuser decreases the radial and tangential velocity of the air and increases the static pressure of the air and directs the air into a deswirl assembly. The deswirl assembly includes an annular housing having a plurality of straight radially extending vanes mounted therein that straighten and reduce the tangential velocity component of the air flow before it enters the combustor section. The combustor section, in some turbine engines, is implemented with an axial throughflow combustor that includes an annular combustor disposed within a combustor housing that defines a plenum. The straightened air enters the plenum and travels axially through the annular combustor where it is mixed with fuel and ignited.

Figure 1:
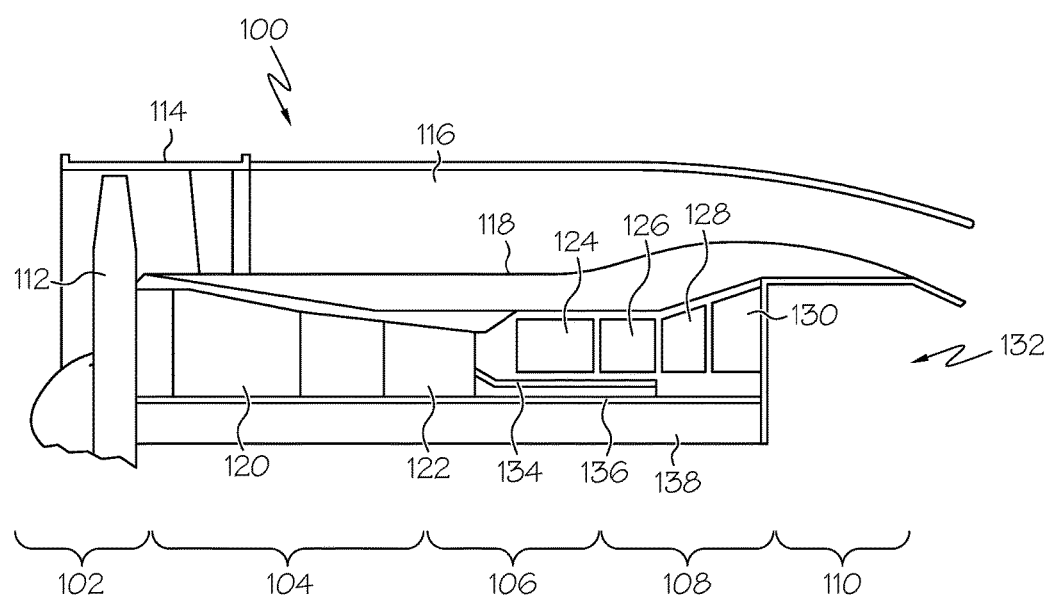
FIG. 1 is a simplified cross section side view of an exemplary multi-spool, propulsion-type gas turbine engine according to an embodiment of the present disclosure.

An exemplary embodiment of a multi-spool, propulsion-type gas turbine engine 100 is depicted in FIG. 1. As previously noted, the propulsion-type turbine engine is only one type of turbine engine that may employ the particle separation technologies of the present disclosure (others include, for example, APUs), and thus FIG. 1 should be understood as illustrative but not limiting. Turbine engine 100 includes an air intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. In the illustrated propulsion-type turbine engine 100, a fraction of the accelerated air exhausted from the fan 112 is directed through a bypass section 116 disposed between the fan case 114 and an engine cowl 118, and provides a forward thrust. However, in non-propulsion type turbine engines, the bypass section 116 need not be present. The remaining fraction of air exhausted from the fan 112 is directed into the compressor section 104.

In the illustrated embodiment, the compressor section 104 includes two compressors: an intermediate pressure compressor 120 and a high pressure compressor 122. Compressors may generally be embodied as radial or mixed flow types. In other embodiments, more or fewer than two compressors may be provided. Returning to FIG. 1, the intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes an annular combustor 124, the high pressure air is mixed with fuel and combusted. The combusted air is then directed into the turbine section 108.

The turbine section 108 includes three turbines disposed in axial flow series, a high pressure turbine 126, an intermediate pressure turbine 128, and a low pressure turbine 130. Here again, in other embodiments, more or fewer than three turbines may be provided. The combusted air from the combustion section 106 expands through each turbine 126, 128, 130, causing each turbine to rotate. The air is then exhausted through a propulsion nozzle 132 (in the case of a propulsion turbine engine) disposed in the exhaust section 110, providing additional forward thrust. As the turbines rotate, each drives equipment in the engine 100 via concentrically disposed shafts or spools. Specifically, in the illustrated embodiment, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

Turning now to FIG. 2, an exemplary cross section of the area between the high pressure compressor 122 and annular combustor 124 is illustrated. In addition to the compressor 122 and combustor 124, FIG. 2 depicts a radially-oriented diffuser 204 and a deswirl assembly 206, each disposed about a longitudinal axis 207. In this embodiment, the high pressure compressor 122 is embodied as a centrifugal compressor and includes an impeller 208 and a shroud 210 disposed in a compressor housing 211. The impeller 208, as alluded to above, is driven by the high pressure turbine 126 and rotates about the longitudinal axis 207. The shroud 210 is disposed around the impeller 208 and defines an impeller discharge flow passage 212 therewith that extends radially outward from longitudinal axis 207. While a radial compressor 122 is disclosed, other types, including mixed flow, may be employed as well.

The diffuser 204 is coupled to the shroud 210 and is configured to decrease the velocity and increase the static pressure of air that is received from impeller 208. In this regard, any one of numerous conventional diffusers 204 suitable for operating with a centrifugal compressor may be employed. In any case, the diffuser 204 includes an inlet 214, an outlet 216, and a flow path 218 that each communicates with the impeller discharge flow passage 212, and the flow path 218 is configured to direct the received air flow radially outward.

The deswirl assembly 206 communicates with the diffuser 204 and is configured to substantially remove swirl from air received therefrom, to thereby decrease the Mach number of the air flow. The deswirl assembly 206 includes an inner annular wall 220, an outer annular wall 222, and pluralities of vanes 224, 226 disposed between the inner annular wall 220 and the outer annular wall 222. The walls 220, 222 define a flow path 228 that is configured to redirect the air from its radially outward direction to a radially inward and axially downstream direction. In this regard, the walls 220, 222 are formed such that the flow path 228 extends between an inlet 230 and outlet 232 in an arc 233 so that when the air exits the outlet 232, it is directed at an angle toward the longitudinal axis 207 and the annular combustor 124. As the angle of the arc 233 is increased the variation of the air angle between the inner wall 220 and out wall 222 is increased.

As noted above, the turbine engine 100 may be configured with an inlet particle separator, located upstream of the compressor section 104, for purposes of efficiently removing relatively large particles (greater than 5 microns, or greater than 20 microns) from the inlet air stream. However, finer particles, such as those smaller than 20 microns, or smaller than 5 microns, may elude the inlet particle separator, and proceed into the turbine engine compressor section 104. Thus, the present disclosure provides additional features, which may be located in the turbine engine compressor section 104, as an alternative or in addition to an inlet particle separator, that serve to efficiently separate any smaller particles from the air stream in the compressor section 104, and thus prevent such smaller particles from entering into the combustor section 106. With continued reference to FIG. 2, in one embodiment, a first fine particle separation means 300 may be embodied as a scavenge plenum connected to the deswirl assembly flow path 228 by means of an extraction slot through the deswirl assembly outer annular wall 222 downstream of the arc 233. In another embodiment, a second fine particle separation means 400 may be embodied as scavenge plenum connected to the deswirl assembly flow path 228 by means of a plurality of holes in the deswirl assembly outer annular wall 222 along the length of the arc 233. In yet another embodiment, a third fine particle separation means may be embodied as a hybrid combination of fine particle separation means 300 and 400. Each of the first, second, and third separation means is described in greater detail below with regard to FIGS. 3A-B, 4A-B, and 5, respectively.

Figure 3A:
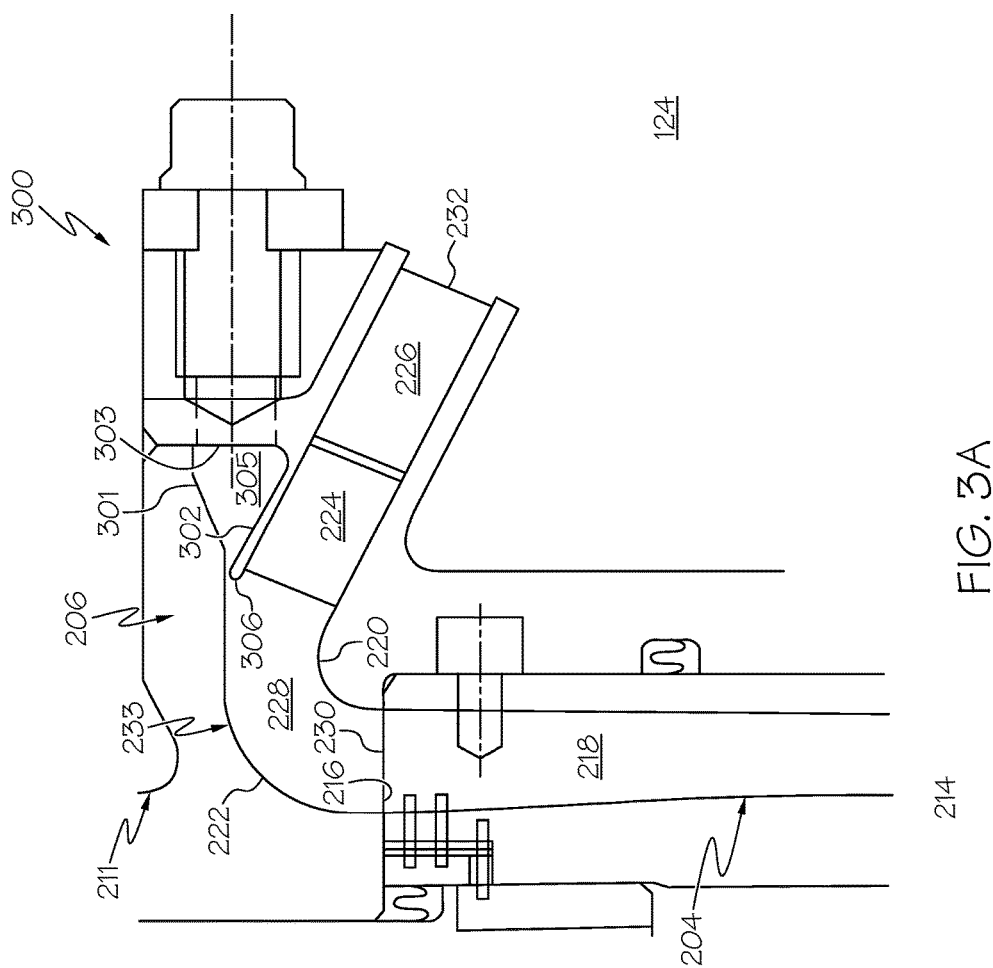
FIGS. 3A-3B are cross section and perspective views, respectively, of a first fine particle separation means in accordance with some embodiments of the present disclosure.
Figure 3B:
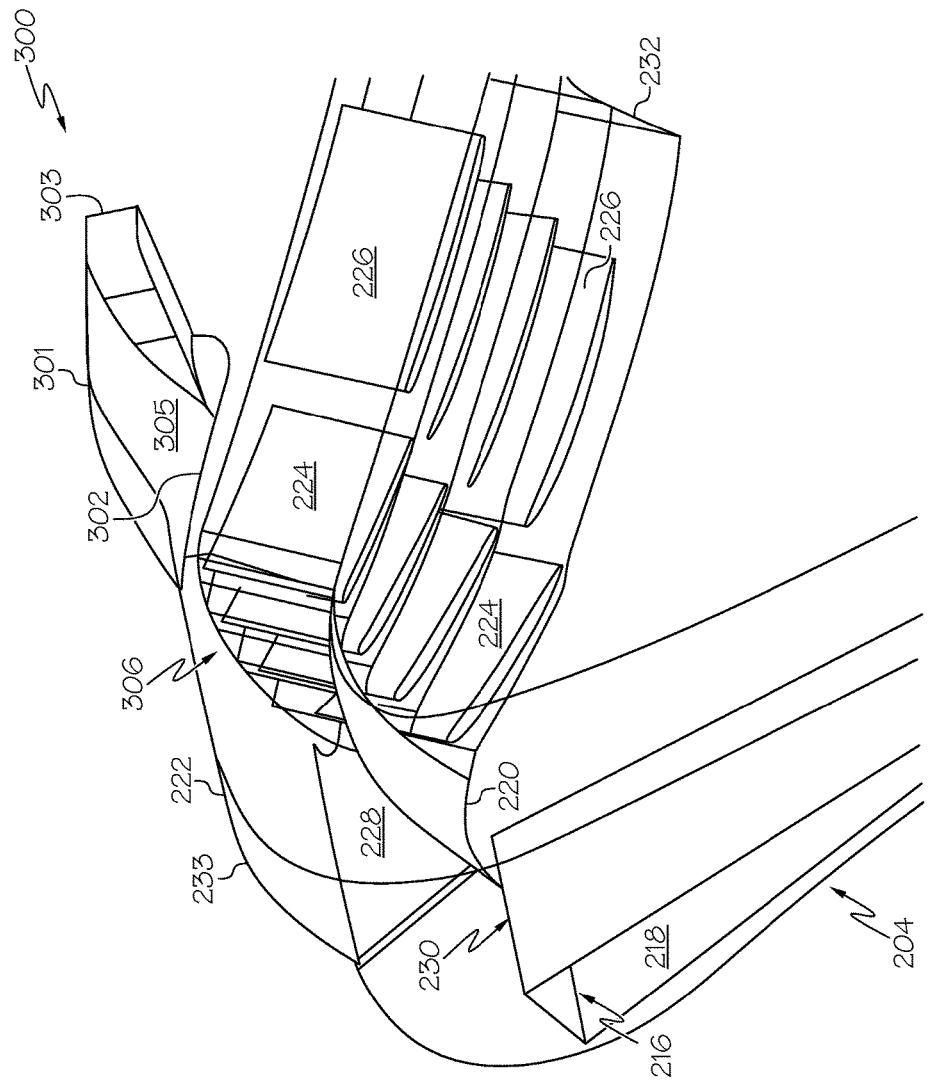

Turning now to the first fine particle separation means 300, as detailed in FIGS. 3A-B, illustrated in particular is the deswirl assembly flow path 228, which as noted above is formed between the inner and outer deswirl annular walls 220, 222. As shown, the compressed air, once passing through the diffuser 204 (via diffuser flow path 218), enters into the deswirl assembly 206 at the deswirl inlet 230. The deswirl assembly 206 changes the flow direction of the compressed air from a radially outward direction from the longitudinal axis 207, to an axially rearward direction (towards the combustor section 106) that also include a small radially inward (downward) component, as illustrated. With the use of computational fluid dynamics (CFD), it has been discovered that fine particles in the compressed air flow stream tend to track closely to the outer annular wall 222 as the flow changes from the radially outward direction to the axially rearward direction (i.e., along the arc 233).

Accordingly, the first fine particle separation means 300 includes an extraction slot 306 in the outer annular wall that leads to a scavenge plenum 305. The extraction slot 306 may be embodied as a continuous slot, or as a series of holes of any shape or count. The extraction slot is axi-symmetrical, and may encompass from about 1% to about 25%, such as about 1% to about 15%, of the area (along a plane perpendicular to the longitudinal axis 207) of the flow path 228. The extraction slot 306 is located along the deswirl flow path 228 at a position downstream of the arc 233, yet prior to the plurality of vanes 224, 226. The extraction slot 306 should be sized such that bleed air through the extraction slot 306 amounts to less than 5%, such as less than 1% of total air flow, preferably as close to 0% as possible. In one embodiment, the scavenge plenum 305 is located radially outward from the deswirl assembly 206 at a position that is radially adjacent to the first (upstream) plurality of vanes 224. The scavenge plenum 305 includes an inner radial wall 302, an outer radial wall 301, and an axial end wall 303 positioned at an opposite axial (downstream) end of the plenum 305 with respect to the extraction slot 306. It is preferred, as illustrated, that a radius of the outer radial wall 301 that connects with the axial end wall 303 is greater than the radius at which the extraction slot 306 is located, and likewise, it is preferred that a radius of the inner radial wall 302 that connects with the axial end wall 303 is at a lower radius than the radius at which the extraction slot 306 is located, all with respect to the longitudinal axis 207. In the illustrated embodiment, the aforesaid small radially inward component of the flow direction is commenced at the plurality of vanes 224, 226 by the vanes 224, 226 being oriented somewhat radially inward (e.g., about 10 to about 45 degrees). As such, the inner radial wall 302 of the scavenge plenum 305 may also have the same radial declination so as to remain parallel and adjacent to the first plurality of vanes 224, as noted above.

In operation, therefore, the compressed air that exits the diffuser 204 at diffuser outlet 216 will enter the deswirl assembly at inlet 230. Any fine particles in the compressed air, as it passes through the deswirl flow path 228, will tend to track along the arc 233 of outer annular wall 222. Prior to encountering the plurality of vanes 224, 226 (and thus prior to the radial declination at the vanes), the fine particles will be extracted from the flow path 228 at the extraction slot 306 located along the outer annular wall 222, and enter into the scavenge plenum 305. In this manner, the fine particles are efficiently prevented from entering the combustion section 124, which as illustrated, is positioned axially downstream from the second plurality of vanes 226 and deswirl assembly outlet 232. Any fine particle accumulation in the scavenge plenum 305 may be removed from time to time by an appropriate port along any wall of the scavenge plenum 305. For example, the scavenge plenum 305 may also incorporate "smart" particle removal mechanisms, such as an electronically-controlled port(s) connected to an engine exhaust or downstream section of the engine, which can be selectively turned on when needed to actively clean particle accumulation out of the plenum 305 under operating and non-operating conditions.

Figure 4A:
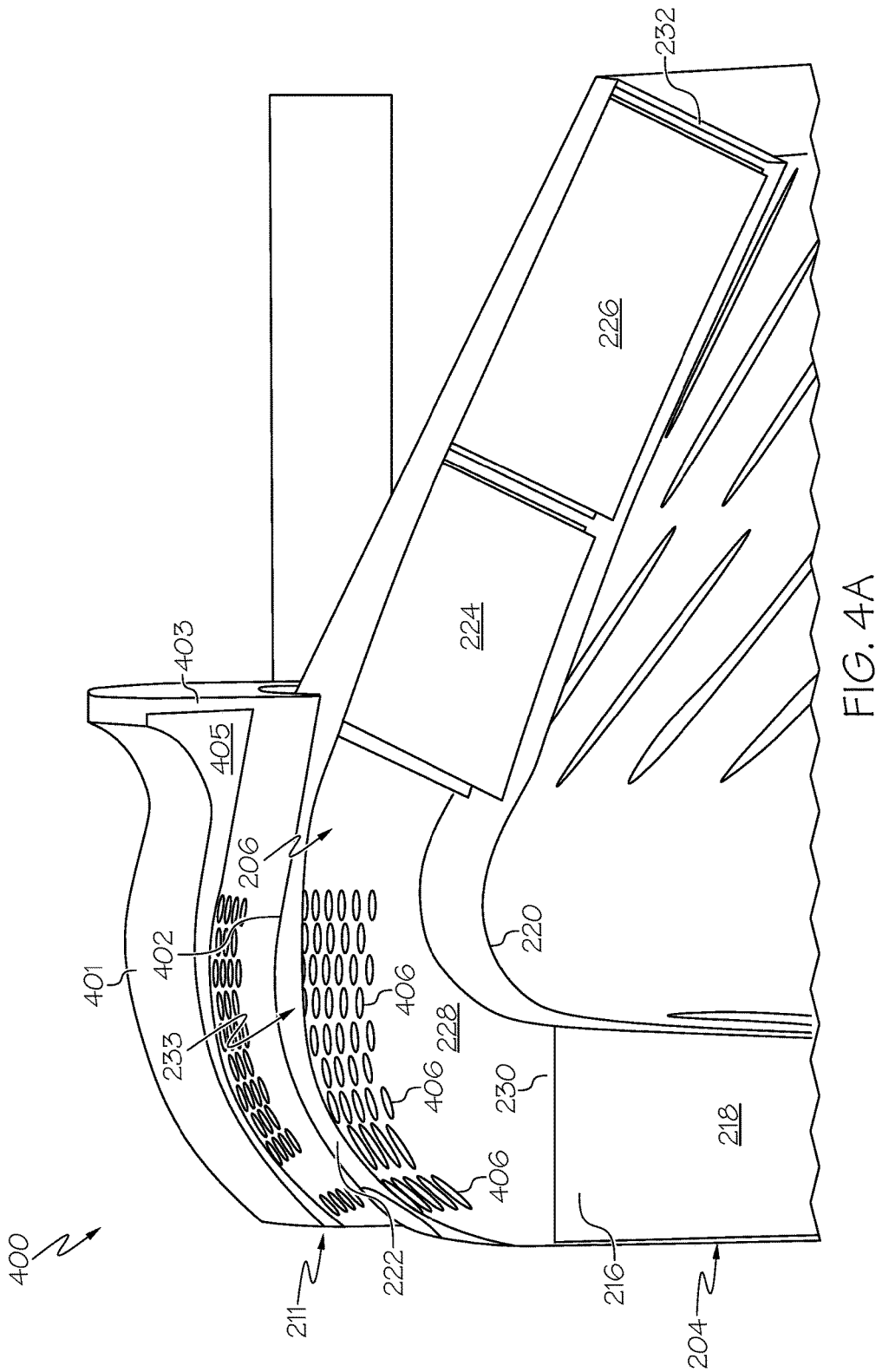
FIGS. 4A-4B are cross section and perspective view, respectively, or a second fine particle separation means in accordance with further embodiments of the present disclosure.
Figure 4B:
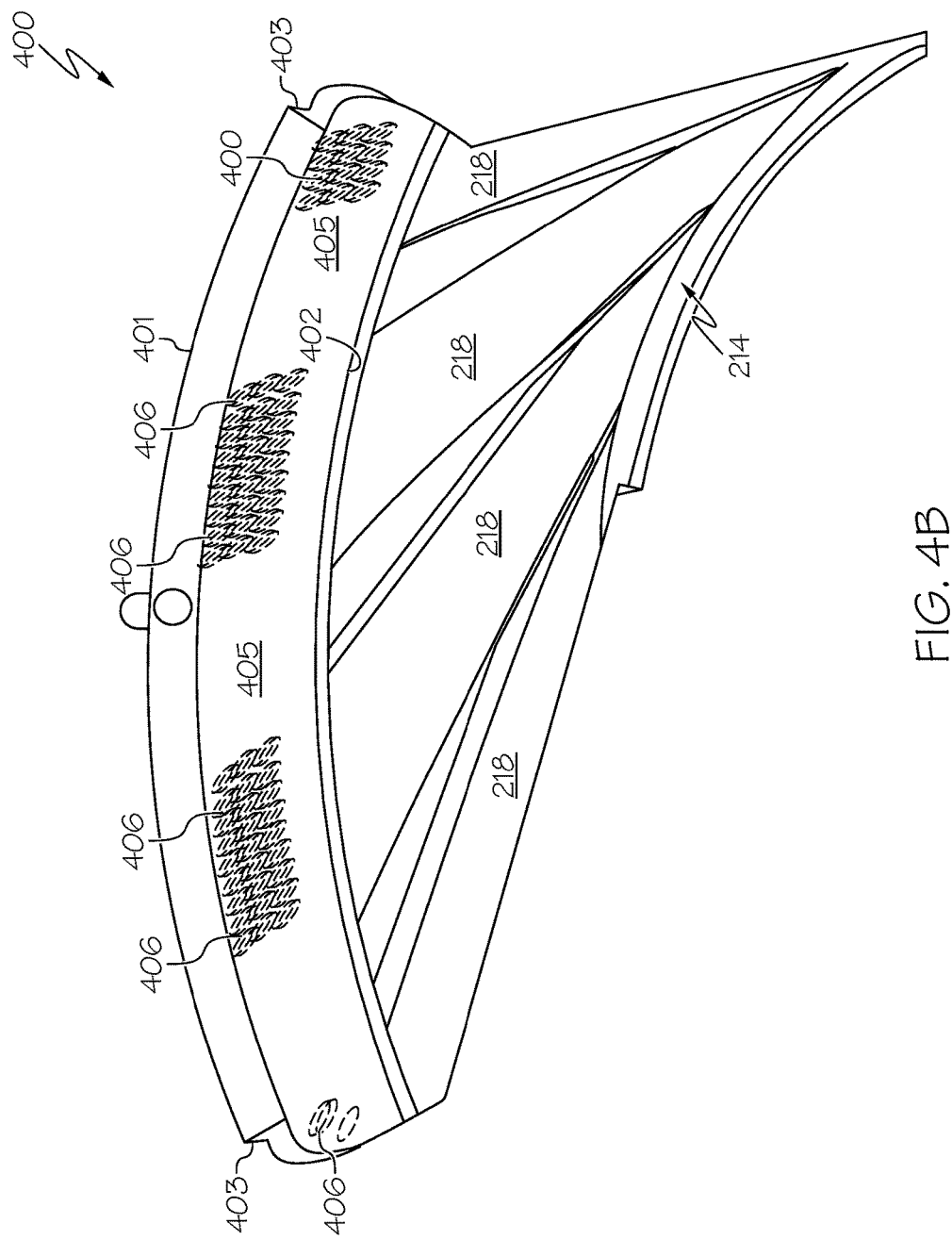

Referring now to the second fine particle separation means 400, as detailed in FIGS. 4A-B, the deswirl assembly outer annular wall 222 is fitted with a plurality of holes 406 along the arc 233. The holes extend through the outer annular wall 222 and the shroud 211 and open into a scavenge plenum 405, the scavenge plenum 405 being positioned radially outward from and adjacent to the deswirl assembly 206 along the arc 233. Although the diameter of the holes may vary from embodiment to embodiment, in a typical embodiment, the holes 406 may have a diameter of about 0.03 inches to about 0.07 inches, such as about 0.05 inches. The spacing between the holes 406 in circumferential rows may be equal to or greater than one diameter of the holes, whereas axial spacing between rows may be staggered to allow the maximum number of holes while maintaining the integrity of the outer annular wall 222 and the shroud 211. In order to preserve the tangential velocity of the compressed air exiting the diffuser 204 in scavenge plenum 405, so that fine particles would continue to rotate freely in the tangential direction in scavenge plenum 405, and negate the need for an active scavenge flow bleed, the plurality of holes have a circumferential angle or "lean" that may be from about 25 to about 65 degrees with respect to the outer annular wall 222, such as from about 35 to about 55 degrees. Moreover, given the change in direction from substantially radial to substantially axial along the deswirl assembly flow path 228, the plurality of holes may also have an axial (rearward, toward the combustor section 106) angle or lean that may be from about 5 to about 20 degrees, for example from about 10 to about 15 degrees, again with respect to the outer annular wall 222. Bleed air through the plurality of holes 406 amounts to less than 5%, such as less than 1% of total air flow, preferably as close to 0% as possible. In addition, the scavenge plenum 405 scavenge has a section of higher radius so that the already trapped fine particles would continue to rotate freely in the tangential direction and help negate the need of active scavenge flow bleed.

The scavenge plenum 405, connected with the plurality of holes 406, may include an inner radial wall 402, and outer radial wall 401, and an axial end wall 403 positioned at an aft-most (downstream) end of the scavenge plenum 405. The inner radial wall 402 and out the outer radial wall 401 may be contoured or curved to match the curvature of the arc 233, such that each of the plurality of holes 406 extends about the same distance between the deswirl assembly flow path 228 and the scavenge plenum 405. In addition, the scavenge plenum 405 scavenge has a section of higher radius so that the already trapped fine particles would continue to rotate freely in the tangential direction and help negate the need of active scavenge flow bleed.

In operation, therefore, the compressed air that exits the diffuser 204 at diffuser outlet 216 will enter the deswirl assembly at inlet 230. Any fine particles in the compressed air, as it passes through the deswirl flow path 228, will tend to track along the arc 233 of outer annular wall 222. As the particles pass along the outer annular wall 222 along the arc 233, the fine particles will be extracted from the flow path 228 through the plurality of holes 406, and enter into the scavenge plenum 405. In this manner, the fine particles are efficiently prevented from entering the combustion section 124, which is positioned axially downstream from the second plurality of vanes 226 and deswirl assembly outlet 232. Any fine particle accumulation in the scavenge plenum 405 may be removed from time to time by an appropriate port along any wall of the scavenge plenum 405, for example the "smart" system as described above.

Figure 5:
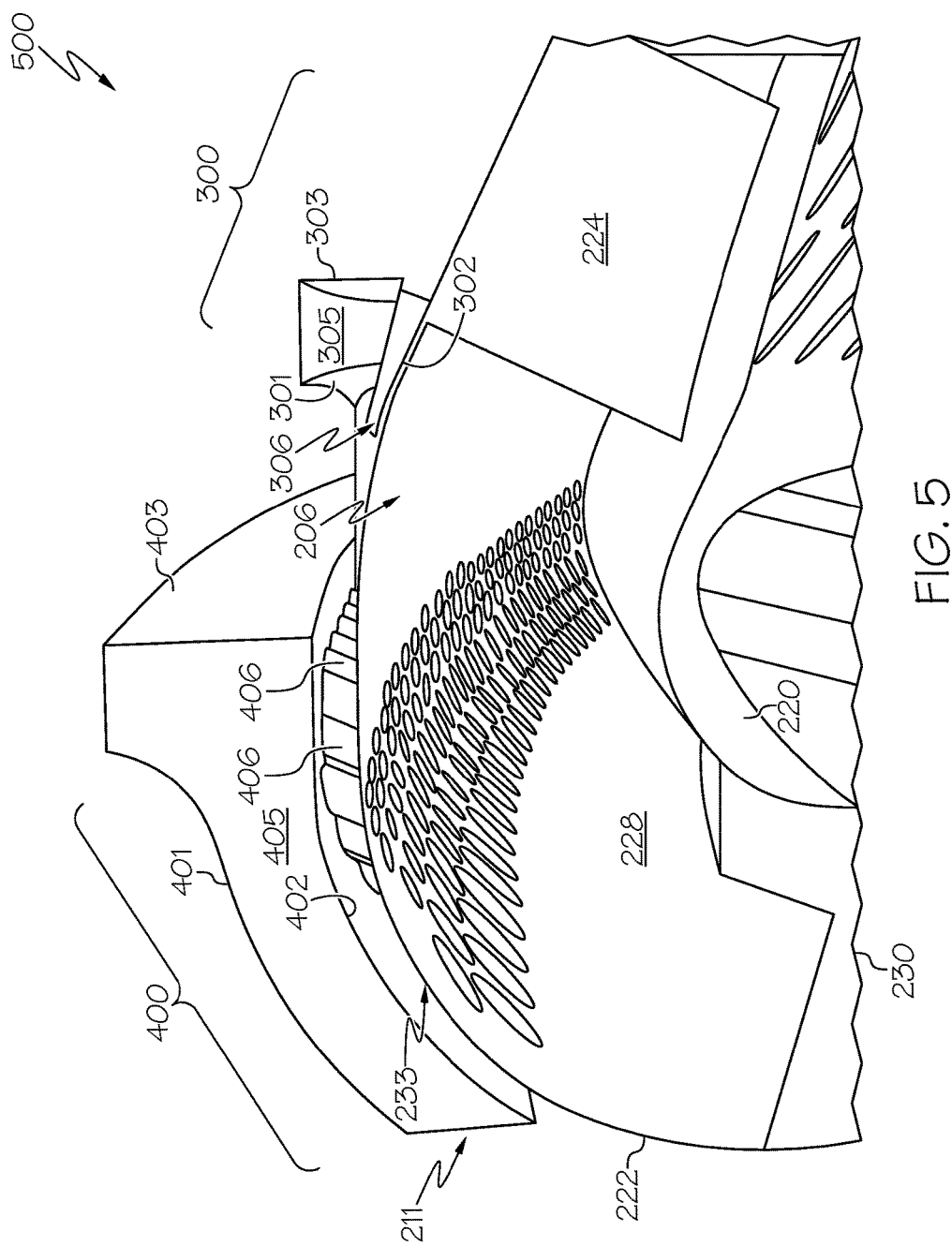
FIG. 5 is cross section view of third, hybrid fine particle separation means incorporating aspects of both the first and second fine particle separation means.

With reference now to the third fine particle separation means 500, as detailed in FIG. 5, a combination or "hybrid" of the separation means 300 and the separation means 400 may be implemented. In this embodiment, an extraction slot 306 is provided in the outer annular wall that leads to a scavenge plenum 305. The extraction slot 306 is located along the deswirl flow path 228 at a position downstream of the arc 233, yet prior to the plurality of vanes 224, 226. The scavenge plenum 305 is located radially outward from the deswirl assembly 206 at a position that is radially adjacent to the first (upstream) plurality of vanes 224. Additionally, the deswirl assembly outer annular wall 222 is fitted with a plurality of holes 406 along the arc 233. The holes extend through the outer annular wall 222 and the shroud 211 and open into a scavenge plenum 405, the scavenge plenum 405 being positioned radially outward from and adjacent to the deswirl assembly 206 along the arc 233. In operation, as the particles pass along the outer annular wall 222 along the arc 233, the fine particles will be extracted from the flow path 228 through the plurality of holes 406, and enter into the scavenge plenum 405. Additionally, any fine particles that miss the holes 406 will be extracted from the flow path 228 at the extraction slot 306 located along the outer annular wall 222, and enter into the scavenge plenum 305. Any fine particle accumulation in the scavenge plenums 305, 405 may be removed from time to time by an appropriate port along any wall of the scavenge plenum 305, 405, for example the "smart" system as described above.

Figure 6:
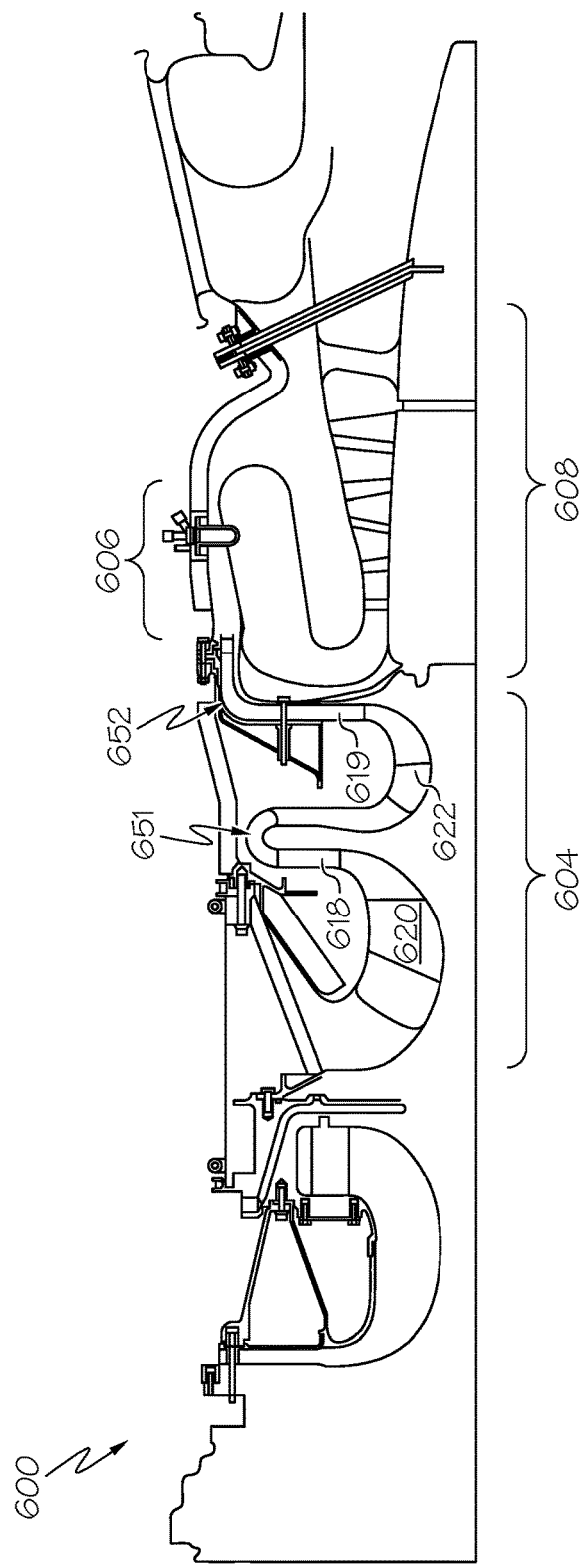
FIG. 6 is a simplified cross section side view of an exemplary APU gas turbine engine including two compressor section according to an embodiment of the present disclosure.

The previously-described embodiments have been set forth in connection with a radial compressor that is located immediate upstream of the combustor section, and including a diffuser and a deswirl assembly. However, other locations in a turbine engine are also possible. More broadly, the fine particle separation means of the present disclosure (300, 400, 500) may be generally positioned anywhere in the air flow path where there is an abrupt change in flow from the radial direction to the axial direction. For example, FIG. 6 illustrates portions of an APU including a compression section 204 including a first and a second radial compressor 620, 622, a combustion section 606, and a turbine section 608. As illustrated, subsequent to the diffuser 618 connected with the first radial compressor 620 is located a bending or arcuate section 651, wherein the air flow changes abruptly from radial to axial. Section 651 would be another suitable location to place the fine particle separation means of the present disclosure 300, 400, 500. Also shown, downstream of the first compressor is the second radial compressor 622, and its associated diffuser 619, subsequent to which is another arcuate section 652, which as shown in previous Figures is a suitable location to place the fine particle separation means of the present disclosure 300, 400, 500. As such, the present disclosure should not be thought of as limited with regard to the placement of the fine particle separation means to any particular radial compressor stage.

Figure 7:
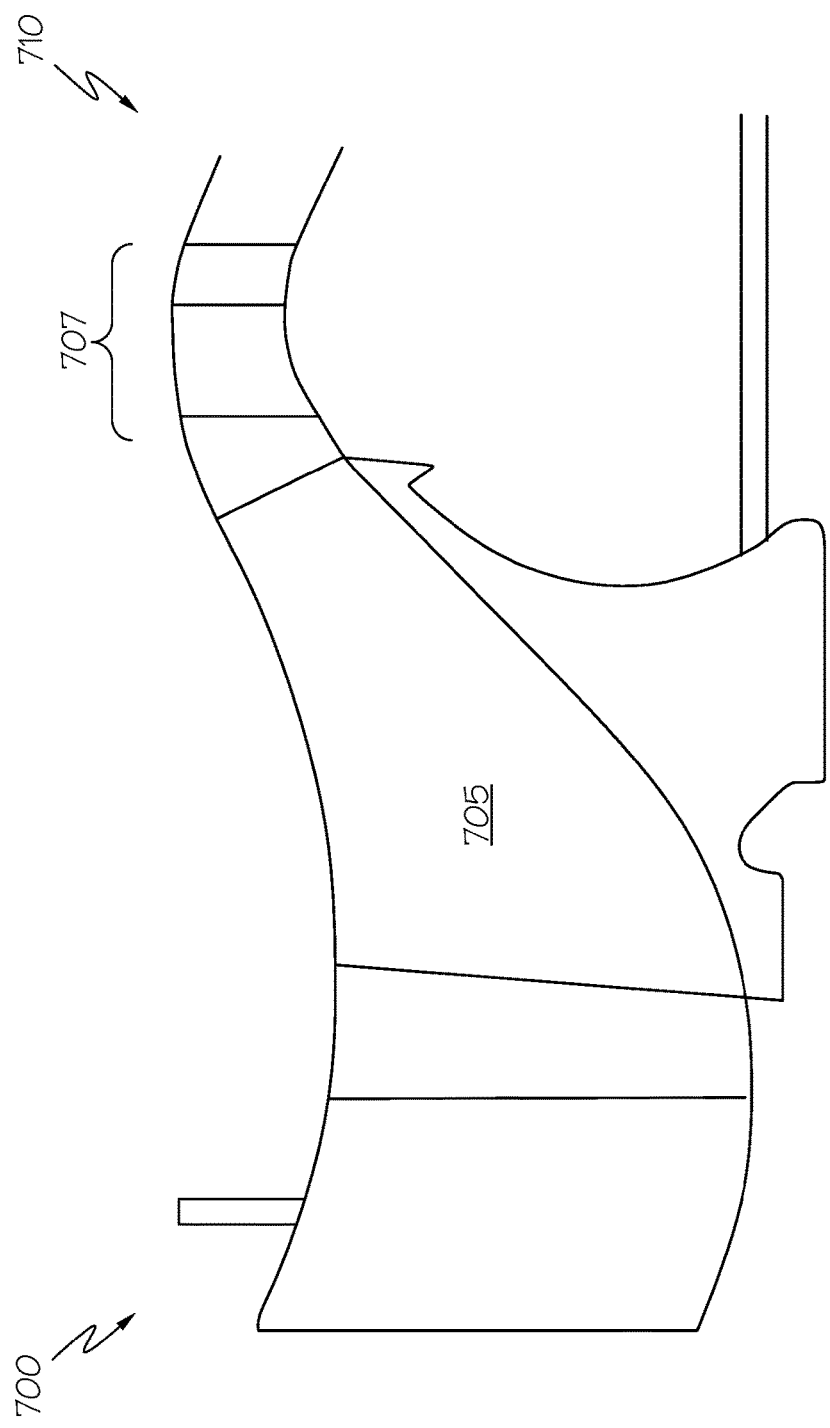
FIG. 7 is a simplified cross section side view of an exemplary gas turbine engine employing a mixed flow compressor, as opposed to a centrifugal compressor, in accordance with yet further embodiments of the present disclosure.

As a further illustration of the concept that the fine particle separation means may be located in any gas turbine engine compressor section (not just radial/centrifugal compressor sections) where there is an abrupt change from a substantially radial flow to a substantially axial flow, FIG. 7 illustrates a gas turbine engine 700 employing a mixed-flow compressor 705, and a stator vane assembly 707 located downstream therefrom. As illustrated, a flow change from the radial direction to the axial direction occurs as compressed air passes from the compressor 705 to the stator vane assembly 707 and there-onward. Thus, as illustrated, at location 710 downstream from the stator vane assembly 707, any of the above-described fine particle separation means 300, 400, 500 may be implemented.

Accordingly, the present disclosure has provided various embodiments of fine particle separation means for use in gas turbine engines, such as propulsion-type engines and APUs. The improved propulsion turbine engines and APUs exhibit improved particle separation efficiency, particularly with regard to fine sand particles. As noted above, these engines may implement the novel particle separation means in addition to or as an alternative to conventional inlet particle separators, and may be located at positions within the engine that are different as compared to conventional inlet particle separators, for example in a compressor section (radial, mixed-flow) anywhere there is an abrupt change in flow path from the radial direction to the axial direction.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine engine incorporating a fine particle separation means, the turbine engine comprising:
   a radial compressor that rotates about a longitudinal axis, and which compresses air fed thereto;
   a radially-oriented diffuser located downstream and radially outward, with respect to the longitudinal axis, from the radial compressor, and which decreases a velocity of and increases a static pressure of the compressed air exiting the radial compressor;
   a flow path positioned downstream and radially outward, with respect to the longitudinal axis, from the diffuser, wherein the flow path comprises an outer annular wall and an inner annular wall between which the compressed air flows, and wherein the flow path comprises an arc that redirects the compressed air from flowing in a substantially radial flow direction to a substantially axial flow direction; and
   an extraction slot at the outer annular wall that fluidly connects with a scavenge plenum, the scavenge plenum being positioned adjacent to and radially outward, with respect to the longitudinal axis, from the outer annular wall at a position downstream axially along the flow path from the arc, the extraction slot also being positioned downstream axially along the flow path from the arc, wherein the extraction slot is defined between the outer annular wall and an inner radial wall of the scavenge plenum that is offset radially inward from the outer annular wall such that the extraction slot occupies about 1% to about 15% of an area of the flow path, measured with respect to a plane perpendicular to the longitudinal axis.

2. The turbine engine of claim 1, wherein the flow path comprises a portion of a deswirl assembly.

3. The turbine engine of claim 2, wherein the deswirl assembly comprises a plurality of vanes that reduce a tangential component of the compressed air, the plurality of vanes being located downstream from the arc.

4. The turbine engine of claim 3, wherein the scavenge plenum is positioned adjacent to and radially outward from, with respect to the longitudinal axis, the plurality of vanes.

5. The turbine engine of claim 1, wherein the scavenge plenum comprises a particle withdrawal port.

6. The turbine engine of claim 1, further comprising a combustion section immediately downstream of the flow path.

7. The turbine engine of claim 1, wherein the turbine engine is a propulsion-type turbine engine or an auxiliary power unit (APU).

8. The turbine engine of claim 1, wherein the extraction slot comprises either an axi-symmetric annulus or a plurality of annularly-disposed holes.

9. The turbine engine of claim 1, further comprising a plurality of holes along the outer annular wall that fluidly connect with a second scavenge plenum, the plurality of holes being positioned along the arc, the second scavenge plenum being positioned adjacent to and radially outward from, with respect to the longitudinal axis, the arc.

10. A turbine engine incorporating a fine particle separation means, the turbine engine comprising:
    a radial compressor that rotates about a longitudinal axis, and which compresses air fed thereto;
    a radially-oriented diffuser located downstream and radially outward, with respect to the longitudinal axis, from the radial compressor, and which decreases a velocity of and increases a static pressure of the compressed air exiting the radial compressor;

a flow path positioned downstream and radially outward, with respect to the longitudinal axis, from the diffuser, wherein the flow path comprises an outer annular wall and an inner annular wall between which the compressed air flows, and wherein the flow path comprises an arc that redirects the compressed air from flowing in a substantially radial flow direction to a substantially axial flow direction; and a plurality of holes formed into the outer annular wall that fluidly connect with a scavenge plenum, the plurality of holes being positioned along the arc such that the compressed air flowing past the holes has a radially-outward flow component, the scavenge plenum being positioned adjacent to and radially outward from, with respect to the longitudinal axis, the arc.

11. The turbine engine of claim 10, wherein the flow path comprises a portion of a deswirl assembly.

12. The turbine engine of claim 11, wherein the deswirl assembly comprises a plurality of vanes that reduce a tangential component of the compressed air, the plurality of vanes being located downstream from the arc.

13. The turbine engine of claim 10, wherein the holes are angled circumferentially from about 25 to about 65 degrees with respect to the outer annular wall.

14. The turbine engine of claim 10, wherein the holes are angled axially rearward from about 5 to about 20 degrees with respect to the outer annular wall.

15. The turbine engine of claim 10, wherein the scavenge plenum comprises a particle withdrawal port.

16. The turbine engine of claim 10, further comprising a combustion section immediately downstream of the flow path.

17. A turbine engine incorporating a fine particle separation means, the turbine engine comprising:

a compressor that rotates about a longitudinal axis, and which compresses air fed thereto;

a flow path positioned downstream from the compressor, wherein the flow path comprises an outer annular wall and an inner annular wall between which the compressed air flows, and wherein the flow path comprises an arc that redirects the compressed air from flowing in a substantially radial flow direction to a substantially axial flow direction; and both of 1) an extraction slot in the outer annular wall that fluidly connects with a first scavenge plenum, the first scavenge plenum being positioned adjacent to and radially outward, with respect to the longitudinal axis, from the outer annular wall at a position downstream axially along the flow path from the arc, the extraction slot also being positioned downstream axially along the flow path from the arc, and 2) a plurality of holes along the outer annular wall that fluidly connect with a second scavenge plenum, the plurality of holes being positioned along the arc, the second scavenge plenum being positioned adjacent to and radially outward from, with respect to the longitudinal axis, the arc.

18. The turbine engine of claim 17, wherein the compressor comprises a radial or mixed-flow compressor.

* * * * *